Jan. 7, 1969  E. F. GREEDY  3,420,312
HARVESTER CUTTING MECHANISM
Filed July 18, 1966  Sheet 1 of 4
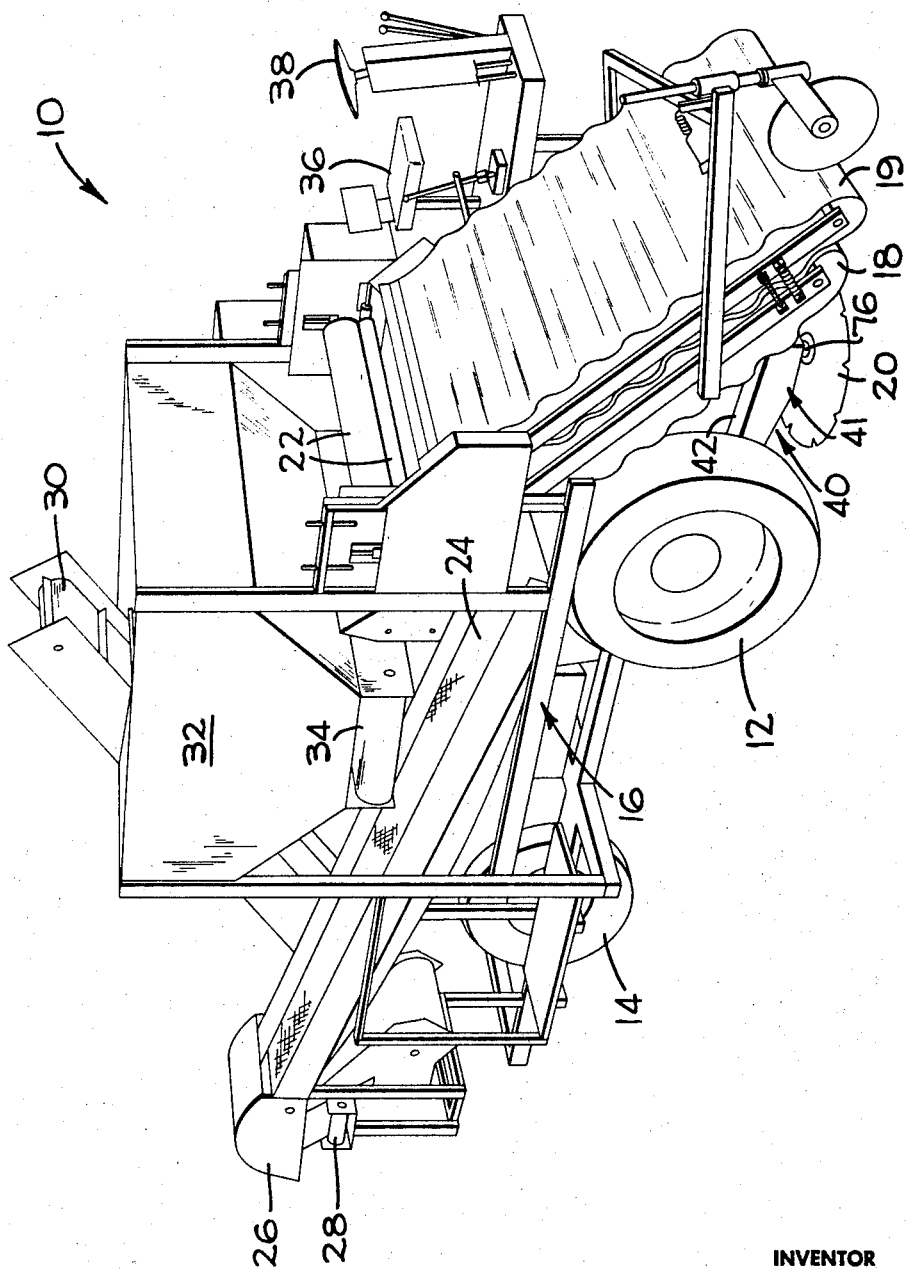
FIG_1
INVENTOR
EDWIN F. GREEDY
BY Francis W. Anderson
ATTORNEY

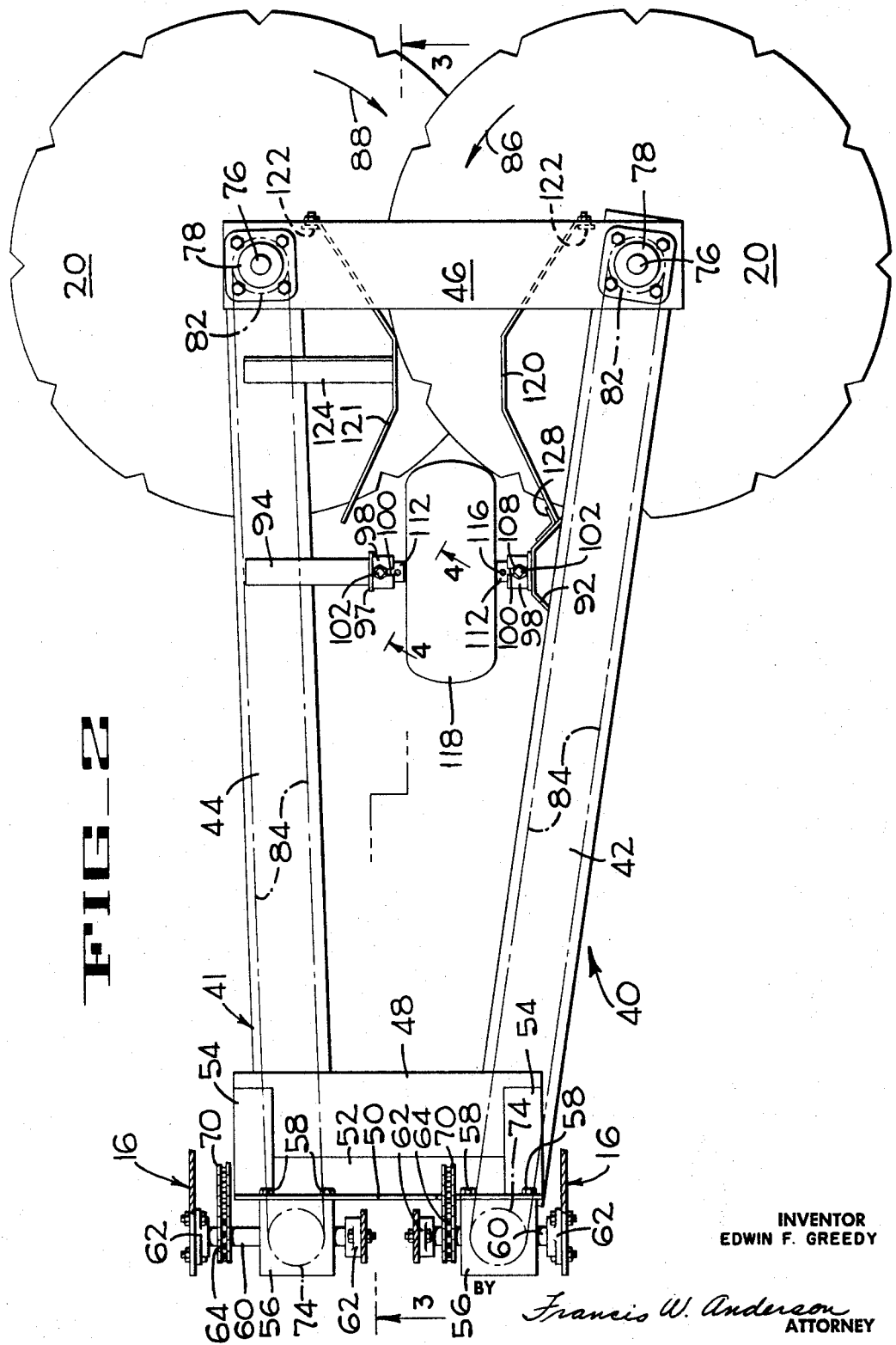

Jan. 7, 1969  E. F. GREEDY  3,420,312
HARVESTER CUTTING MECHANISM
Filed July 18, 1966  Sheet 3 of 4
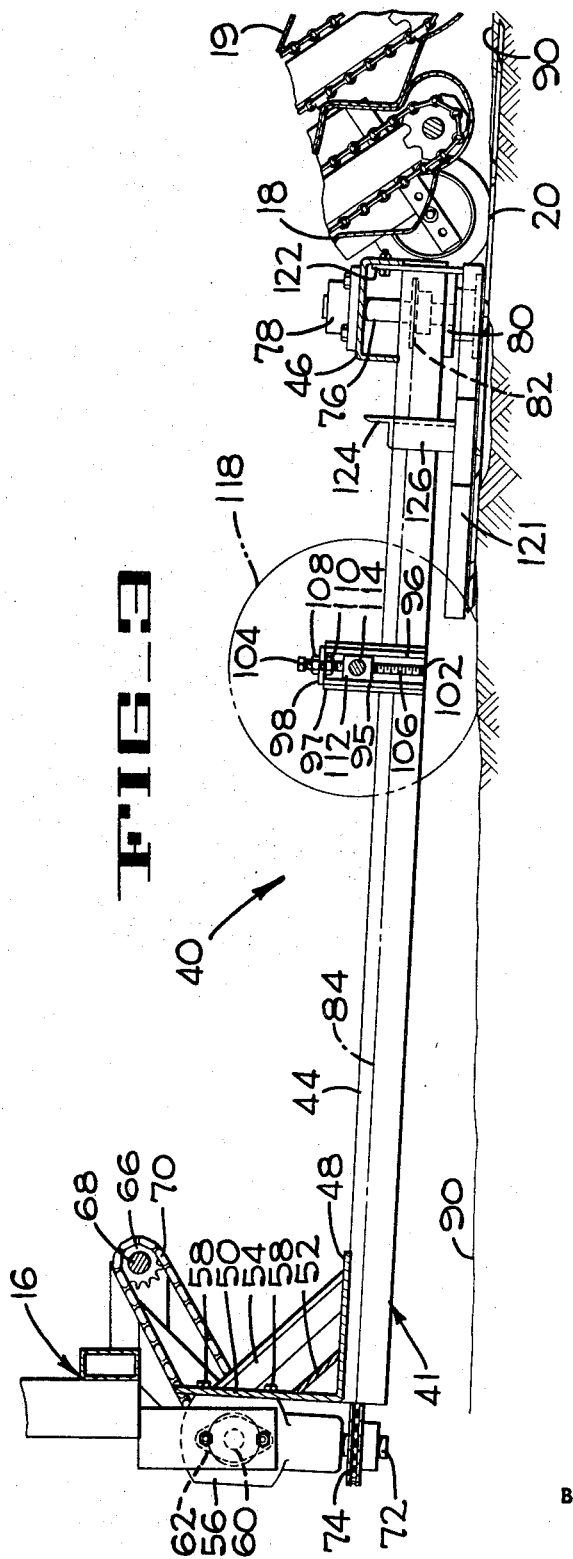
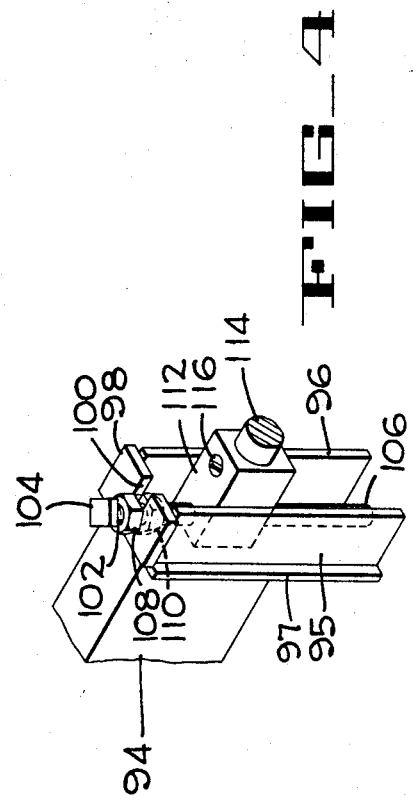
INVENTOR
EDWIN F. GREEDY
BY Francis W. Anderson
ATTORNEY

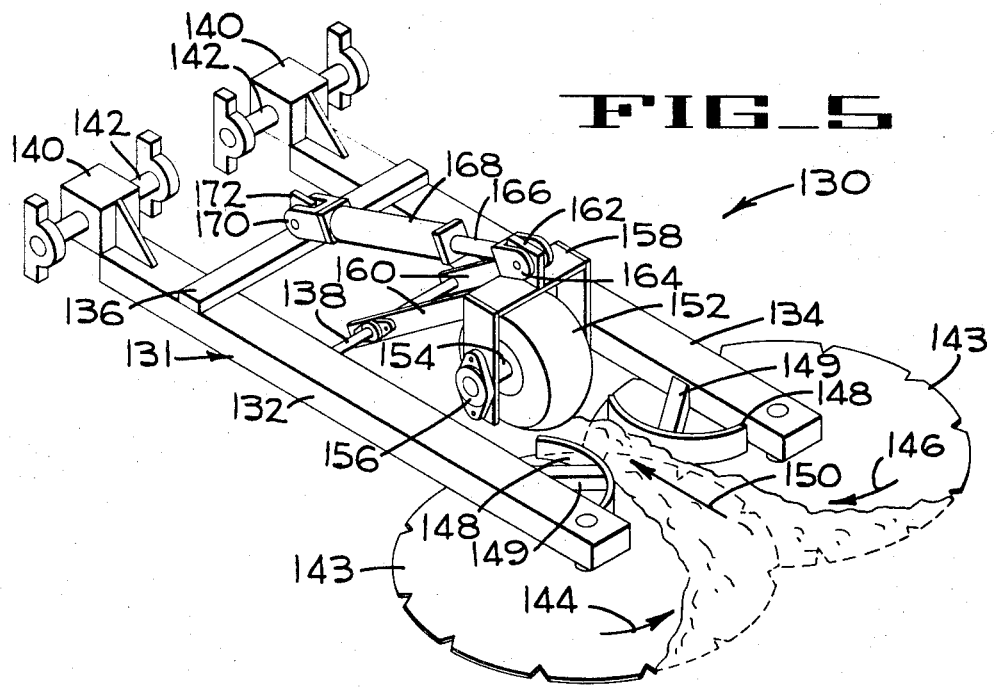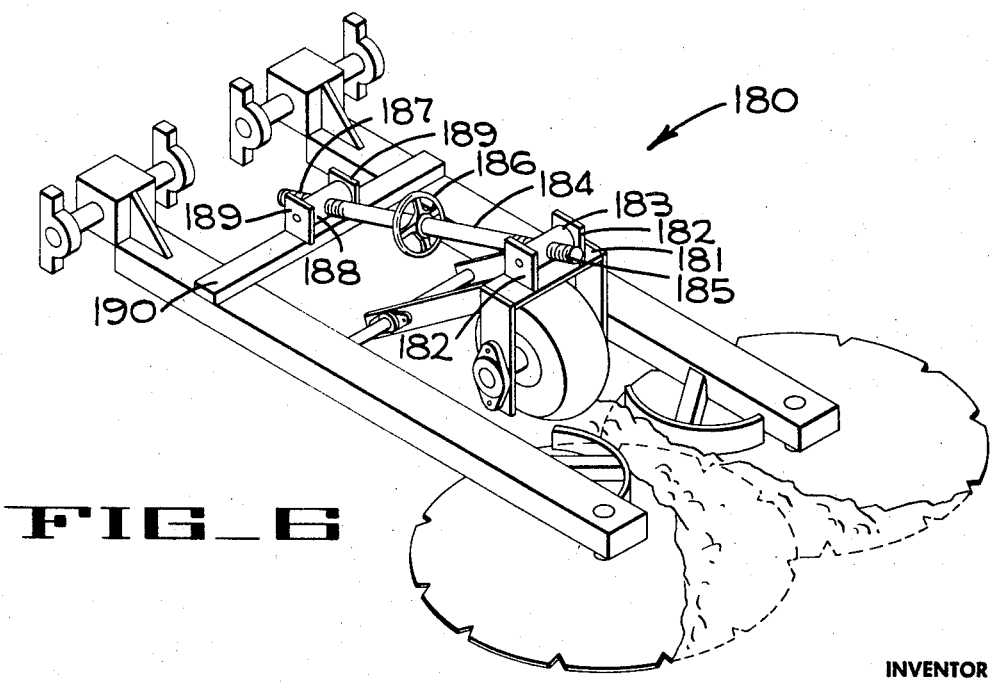

United States Patent Office 3,420,312
Patented Jan. 7, 1969

3,420,312
HARVESTER CUTTING MECHANISM
Edwin F. Greedy, Hoopeston, Ill., assignor to FMC Corporation, San Jose, Calif., a corporation of Delaware
Filed July 18, 1966, Ser. No. 565,813
U.S. Cl. 171—61    11 Claims
Int. Cl. A01d *13/00;* A01d *15/00*

This invention pertains to cutting mechanism for a harvester and more particularly concerns a regulator, suitable for use with a cucumber harvester, which maintains the vine cutting mechanism of a harvester at a desired cutting depth beneath an irregular ground surface.

Crops, such as pickle-type cucumbers, are harvested by machines designed to operate on the once-over picking technique. At the optimum time, a harvesting machine passes through a field drawing vines and cucumbers upward, while plant roots are severed at or slightly below the ground surface. The cucumbers are then separated from the vines, cleaned, sorted and collected for unloading. Difficulties have been experienced with certain harvesters when operated on irregular ground surfaces which are characteristic of most fields. Such irregularities tend to cause the cutting means, which sever the vines from the roots, to burrow into the ground or else come out of the ground and cut the vines above the surface. Thus, the operator must be alert and continuously watching the operation of the cutting means.

An object of the present invention is to provide an improved cutting mechanism for a harvester.

Another object of the present invention is to provide an automatic regulator for maintaining cutters of a harvester at a uniform cutting depth beneath an irregular ground surface.

An additional object of the invention is to reduce irregular crop cutting and thereby increase harvest yield.

A further object of the invention is to enable cutting at various selected depths set readily by simple adjustments.

Other objects and advantages of the invention will be apparent from the following detailed description, reference being made to the annexed drawing, in which:

FIGURE 1 illutsrates in perspective a cucumber harvester wherein the cutting mechanism of the present invention is utilized.

FIGURE 2 is a horizontal section taken longitudinally through the harvester of FIGURE 1 particularly showing the chassis of the harvester and the cutting regulating of the present invention.

FIGURE 3 is a vertical section taken on the line 3—3 of FIGURE 2.

FIGURE 4 is an enlarged perspective of a portion of the adjusting mechanism, the view being taken looking in the direction of arrows 4—4 of FIGURE 2.

FIGURE 5 is a fragmentary schematic perspective of a modified form of sub-surface cutting depth regulator with hydraulic adjusting means.

FIGURE 6 is an enlarged perspective similar to FIGURE 5 but showing a second modified form of the sub-surface cutting depth regulator of the present invention.

Referring to FIGURE 1, a conventional type of cucumber harvester 10 is shown having a pair of front wheels 12 and a steerable rear wheel 14. A lower frame 16 is supported by the wheels and carries a pair of fluted, or corrugated vine pick-up belts 18 and 19, the adjacent runs of the belts being effective to pick up loose vines and carry them upwardly. Rotating knife blades 20 are positioned behind the lower end of the pickup belts, to sever the vines from the ground while a series of pinch off rollers 22 are fixed behind the upper end of the pick-up belts and arranged to receive the vines from the belts. An open wire mesh belt 24 is supported by the frame and extends from beneath the pinch-off rollers, from which it receives cucumbers, to a lateral conveyor 28 that extends to the lower end of a rubber cleated belt 30. Cucumbers are discharged from the upper end of the rubber cleated belt into a rubber-bottom hopper 32. An unloading conveyor 34 extends beneath the hopper and projects outward transversely of the harvester to carry the cucumbers to a field truck or crates. A seat 36 is provided at the left front corner of the harvester for an operator, not shown, who sits thereon and handles steering wheel 38, together with other controls.

A cutting depth regulator 40 (FIG. 2) in accordance with the present invention, is located rearwardly of the cutter discs 20 and beneath the pick-up belts of the harvester. The regulator 40, as shown in FIGURES 2 and 3, includes a pivot frame 41 formed by tubular longitudinal member 42 and 44 which are connected transversly by an inverted channel 46 welded across the front ends and by an angle 48 welded across the rear ends. The angle has an upstanding leg 50 braced lengthwise by a diagonal plate 52 and at each end by angles 54. Gear boxes 56 are connected to the upstanding leg 50 by bolts 58. A horizontal shaft 60 passes through each gear box in a manner enabling the gear box and frame to pivot thereabout while allowing the shaft to rotate freely therein. The ends of each shaft are journalled in bearing blocks 62 which in turn are bolted to the lower frame 16 of the harvester 10.

A sprocket wheel 64 is fixed on each horizontal shaft 60, and two drive sprockets 66 (one only being shown in FIGURE 3) are keyed to a transverse drive shaft 68 that is part of the drive mechanism of the harvester. Drive chains 70 are trained about the drive sprockets and sprocket wheels. Within each gear box 56 is a conventional gear arrangement, such as bevel gears, which transmit rotation of the horizontal shaft 60 to a vertical shaft 72 depending therefrom. A sprocket wheel 74 is mounted on each vertical shaft opposite the ends of the longitudinal members 42 and 44. At the front end of each longitudinal member, a driven shaft 76 extends vertically therethrough and is journalled in an upper bearing block 78 bolted to the channel 46 and a lower bearing block 80 fastened to the bottom of the longitudinal member. A sprocket wheel 82 is mounted on each driven shaft within the longitudinal members, and a drive chain 84 is trained about the sprocket wheels 74 and 82. The end of driven shaft 76 projects through the lower bearing block 80 and has a rotating cutting disc 20 mounted thereon.

The cutter discs 20 overlap along edges spaced intermediately of the longitudinal members, with the disc that is suspended from member 42 being positioned slightly above the disc suspended from member 44. Each disc rotates in a direction such that its periphery moves rearwardly of the longitudinal members at the overlapping section, as indicated in FIGURE 2 by arrows 86 and 88. The blades extend parallel with the longitudinal members and are inclined downwardly so that the front edges of the blades pass beneath the surface 90, as shown in FIGURE 3, while the rear edges of the blades project above the surface.

The frame formed by longitudinal members 42 and 44 is free to pivot about the horizontal shafts 60. To support the front end of the frame, bracket 92 (see FIGURE 2) is welded to the inner side of member 42, while tube 94 is welded to member 44. As seen in FIGURE 4, a vertical guide channel, made up of side plates 95 and 96, a rear plate 97 and a top plate 98, all welded together, is secured to the inner end of the tube 94. An identical guide channel is welded to the inner face of the bracket 92. Each top plate 98 has a slot 100 therein to receive a captive adjustment bolt 102, as shown in FIGURE 4. The adjustment bolts have a head portion 104 and a threaded portion 106. A lock nut 108 is threaded upon the adjustment bolt beneath the head portion and a limit nut 110 is welded on the threaded portion of the bolt beneath the lock nut. The top plate bears upon the limit nut and rotation of the bolt is prevented by tightening the lock nut. Slide blocks 112 fit within the channel legs and are threaded upon the threaded portion of the bolts beneath the limit nuts. A shaft 114 extends between the slide blocks which are locked thereon by set screws 116. A pilot wheel 118 having internal bearings, not shown, is mounted for free rotation upon the shaft 114 and supports the frame upon the surface 90, of the ground as shown in FIGURE 3.

The pilot wheel 118 is positioned directly behind the overlapping section of rotating knife blades 20, as shown in FIGURE 2. A pair of dirt scrapers 120 and 121 are suspended over the knife blades by vertical straps 122 which are bolted to channel 46. A horizontal angle 124 is welded to the longitudinal member 44 and projects inwardly therefrom. A vertical angle 126 is shown in FIGURE 3 welded to the end of the horizontal angle to provide support for the intermediate portion of the scraper 121. The rear portion of scraper 120, shown in FIGURE 2, is supported by a strap angle 128, welded to the bracket 92. The scrapers converge inwardly from straps 122 to form a narrow channel opposite angle 124 and then diverge outwardly on each side of the pilot wheel. The scrapers fit closely above the top surface of the rotating knife blades to wipe dirt therefrom and direct it rearwardly towards pilot wheel 118.

In operation, the harvester 10 passes through a cucumber field drawing vines and cucumbers between pickup belts 18. The vines are severed from the plant roots by the rotating discs 20 and the cucumbers are separated from the vines by pinch-off rollers 22. The cucumbers, being of a larger diameter than the vines, are pinched off as the vines pass between the rollers. The vines fall to the ground from the rollers while the cucumbers drop onto the wire mesh belt 24. As the cucumbers are conveyed along the belt, loose sand and dirt sifts through the belt and blower 26 removes any loose foliage or other foreign matter. The cucumbers are then transferred by lateral conveyor 28 to rubber cleated belt 30, which elevates the cucumbers into the rubber bottom hopper 32. When the hopper is filled, unloading conveyor 34 is actuated to discharge the cucumbers into field trucks or crates for shipment to a processing plant.

To adjust the cutting depth regulator 40 for operation, the captive adjustment bolts 102 are set so that when the pilot wheel 118 is on the ground the forward edges of the cutting discs are a predetermined desired distance below the ground. To make this setting, the lock nuts 108 are loosened and the bolts are turned by the head portions 104, causing them to move up or down within the slide blocks 112 which, of course, are held against rotation by the guide channels. The frame defined by longitudinal members 42 and 44 pivots up or down about the horizontal shafts 60 as the bolts move, since the top plates 98 rest upon limit nuts 110. Thus, the leading edges of rotating knife blades 20 are set at a desired cutting depth. Lock nuts 108 are then tightened to maintain the cutting depth setting.

As the harvester moves through a field, the knife blades 20 rotate in response to drive shaft 68, which turns drive sprockets 66 causing drive chains 70 to turn sprocket wheels 64. Rotation of the sprocket wheels turn the horizontal shafts 60 and this rotation is translated within the gear boxes 56 to rotate vertical shafts 72 in directions opposite to each other. Rotation of the vertical shafts turn sprocket wheels 74, rotating drive chains 84 and turning sprocket wheels 82. This drives the driven shafts 76, causing knife blades 20 to rotate as indicated by the arrows 86 and 88. The front edges of these rotating knife blades pass slightly beneath the surface 90, as indicated in FIG. 3, and dirt above the blades is conveyed thereon towards the scrapers 120 and 121. The dirt flows through the narrow channel defined by the scrapers towards pilot wheel 118. It then drops from the blades in front of the pilot wheel, which passes over the dirt. When the pilot wheel is properly adjusted, a small ridge of dirt is deposited in front of the wheel, but when the cutting blades run too deep, more dirt is conveyed towards the wheel forming a larger ridge. This causes the pilot wheel to roll up the ridge and lift the knife blades to a more shallow position. Conversely, when the knife blades run too high, less dirt is brought to a position in front of the pilot wheel so that a smaller ridge is formed. This causes the pilot wheel to run in a lower position and it, in turn, drops the knife blades. Thus, it will be seen that the cutting depth regulator 40 provides for automatic adjustment of the knife blades as the harvester 10 passes through a field having an irregular surface so that a uniform cutting depth can be maintained.

In one successful installation the sensing wheel 118 included an 8.00 x 6 pneumatic tire which had a diameter of 17.5 inches.

A second embodiment of the depth control mechanism of the invention is illustrated in FIGURE 5. A regulator 130 is shown which includes a frame 131 defined by longitudinal members 132 and 134, spaced transversely by a brace 136 and a shaft 138. A gear box 140 is connected to the end of each longitudinal member and these boxes are pivotably mounted on horizontal drive shafts 142. The gear boxes 140 and shafts 142 are identical to the boxes 56 and shafts 60 of FIGURE 2 and, in addition to providing a pivot axis for the frame, they are arranged to drive the cutter discs 143. The rotating discs 143 are suspended from the opposite ends of the longitudinal members of the frame and are driven by a conventional chain drive assembly similar to the one previously disclosed. The cutter discs rotate in the direction of arrows 144 and 146 respectively. A dirt scraper 148 is supported from each longitudinal member by a brace 149 and is effective to wipe the dirt from the adjacent cutter, causing the dirt to flow in a channel as indicated by the arrow 150. A pilot wheel 152 is positioned behind the dirt scrapers in alignment with the channel. The pilot wheel is mounted upon an axle 154, journalled in bearing blocks 156 that are bolted to each side of an inverted U-shaped frame 158. A pair of support arms 160 are connected to the frame and are pivotably mounted upon the transverse shaft 138. An ear 162 projects upward from the frame 158, and a clevis 164 is pivotally connected thereto. A piston rod 166 is fixed to the clevis and extends into a hydraulic cylinder 168. The opposite end of the cylinder is fixed to a clevis 170 which is pivoted to an ear 172, projecting upwardly from brace 136.

Hydraulic controls, not shown, are provided so that an operator sitting in seat 36 can regulate the initial position of piston rod 166. As the piston rod is extended from the hydraulic cylinder 168, the support arms 160 pivot clockwise (FIGURE 5) on shaft 138, lowering frame 158 and a pilot wheel 152. By lowering the pilot wheel, the cutting depth of blades 143 is reduced. Conversely, when the piston rod retracts into the cylinder, the support arms pivot upwardly on the shaft to elevate the pilot wheel and increase the cutting depth of the blades. With the exception of the hydraulic cylinder for making the initial adjustment of the pilot wheel, operation of the regulator 130 is similar to the operation previously described for regulator 40.

A second modified form of the invention is shown in FIGURE 6. A regulator 180 is illustrating having the same basic structure as the regulator 130, shown in FIGURE 5, with the exception of the pilot wheel adjustment control. Welded to the top of pilot wheel frame 181 are a pair of ears 182, between which a travel nut 183 is pivotably mounted. A double worm shaft 184 has a threaded end portion 185 which fits within the travel nut. A control wheel 186 is mounted near the center of the shaft, while at the opposite end is a threaded portion 187 fitting through travel nut 188. This travel nut is pivotably mounted between ears 189 projecting upward from brace 190. By turning the control wheel, the double worm shaft rotates so that the travel nuts move inward or outwardly thereon. The pilot wheel frame pivots up or down in response to shortening or lengthening the distance between travel nuts. The initial pilot wheel adjustment can be readily made by a person standing beside the regulator in a position to operate the control wheel.

It will be understood that modifications and variations of the embodiments of the subsurface cutting depth regulator disclosed herein can be resorted to without departing from the spirit of the invention and the scope of the appended claims.

Having thus described my invention, what I claim as new and desire to protect by Letters Patent is:

1. In the operation of a vine-cutting mechanism of the type wherein two oppositely-rotating laterally adjacent cutting discs are arranged for joint bodily movement in a forward direction with their leading peripheral edges disposed a small distance below the surface of the ground and movable toward each other, the method of adjusting the cutting depth of the discs which comprises sensing the height of the dirt deposited rearwardly of the discs on the ground substantially in the plane of the longitudinal centerline of the vehicle by the discs and, selectively raising and lowering the cutter discs in proportion to the height of the dirt below or above a desired height.

2. In combination a mobile support structure, means for moving said vehicle forwardly, a pair of oppositely-rotating laterally adjacent cutting discs, means mounting said discs on said structure, means for rotating said discs in opposite directions with their leading peripheral edges disposed below the surface of the ground and moving inwardly toward a vertical plane through the longitudinal centerline of said structure, means for sensing the height of dirt deposited by said discs rearwardly thereof during forward movement of said mobile support structure, and means operatively connected between said sensing means and said disc mounting means for adjusting the height of said discs in response to changes in the height of the deposited dirt.

3. The apparatus of claim 2 including means for guiding dirt discharged from said discs into a localized area immediately behind said discs and substantially on the longitudinal centerline of the mobile support structure for engagement by said sensing means.

4. The apparatus of claim 2 wherein said mounting means is a frame that carries said discs and is pivoted on said mobile supported structure.

5. The apparatus of claim 4 wherein said sensing means is a wide-rim wheel mounted on said frame.

6. The apparatus of claim 4 including means for adjusting the position of said sensing means relative to said frame to change the relative elevation of the ground-contacting surface of said sensing means and said discs.

7. The apparatus of claim 6 wherein said adjusting means includes guide means on said frame, a transverse member connected to said sensing means and arranged for vertical guided movement in said guide means, and means for adjustably moving said transverse member in said guide means.

8. The apparatus of claim 6 wherein said adjusting means includes means mounting said wheel for movement in a generally vertical direction relative to said frame, and power means operatively connected between said wheel mounting means and said frame.

9. The apparatus of claim 6 wherein said sensing means is a wide rim wheel and said adjusting means is a pair of guide channels mounted on said frame, a block slidable in each guide channel, a shaft journalling said wheel and connected to each block, and means for varying the vertical position of said blocks in said channels.

10. The apparatus of claim 6 wherein said sensing means is a wide rim wheel and said adjusting means comprises lever means pivotally mounting said wheel on frame and a power cylinder operatively connected between said lever means and said frame.

11. The apparatus of claim 6 wherein said sensing means is a wide rim wheel and said adjusting means comprises lever means pivotally mounting said wheel on said frame and a power screw operatively connected between said lever means and said frame.

References Cited

UNITED STATES PATENTS

| | | | |
|---|---|---|---|
| 1,099,414 | 6/1914 | Williams | 56—121.46 |
| 2,830,518 | 4/1958 | Kassel | 172—4 |
| 3,295,301 | 1/1967 | Looker | 56—327 |

ANTONIO F. GUIDA, *Primary Examiner.*

U.S. Cl. X.R.

171—21; 56—121.46, 327; 172—4